US006778967B1

(12) United States Patent
Nicholson

(10) Patent No.: US 6,778,967 B1
(45) Date of Patent: *Aug. 17, 2004

(54) SYSTEM AND METHOD OF CROSS-SELLING PRODUCTS AND INCREASING FUEL SALES AT A FUEL SERVICE STATION

(75) Inventor: G. Randy Nicholson, Abilene, TX (US)

(73) Assignee: Auto Gas Systems, Inc., Abilene, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/412,415

(22) Filed: Oct. 5, 1999

(51) Int. Cl.[7] .............................. G06F 17/60; G06K 5/00
(52) U.S. Cl. .......................... 705/14; 235/380; 235/381; 235/375; 235/470; 235/383; 235/382
(58) Field of Search ........................ 705/14, 5; 235/381

(56) References Cited

U.S. PATENT DOCUMENTS

| | | | |
|---|---|---|---|
| 3,852,576 A | * 12/1974 | Rudd | ........................... 209/33 |
| 4,723,212 A | 2/1988 | Mindrum et al. | |
| 4,821,186 A | 4/1989 | Munakata et al. | |
| 4,825,045 A | 4/1989 | Humble | |
| 4,910,672 A | 3/1990 | Off et al. | ..................... 364/405 |
| 5,056,019 A | 10/1991 | Schultz et al. | |
| 5,173,851 A | * 12/1992 | Off et al. | ....................... 705/14 |
| 5,200,889 A | 4/1993 | Mori | |
| 5,202,826 A | 4/1993 | McCarthy | ................... 364/405 |
| 5,481,094 A | 1/1996 | Suda | |
| 5,521,364 A | 5/1996 | Kimura et al. | |
| 5,612,868 A | 3/1997 | Off et al. | ..................... 364/214 |
| 5,806,045 A | 9/1998 | Biorge et al. | |
| 5,822,735 A | 10/1998 | De Lapa et al. | ................ 705/14 |
| 5,862,222 A | 1/1999 | Gunnarsson | ................. 380/24 |
| 6,098,879 A | 8/2000 | Terranova | ................... 235/384 |
| 6,116,505 A | * 9/2000 | Withrow | ..................... 235/381 |
| 6,152,591 A | * 11/2000 | McCall et al. | ............... 235/380 |
| 6,157,871 A | * 12/2000 | Terranova | ..................... 141/94 |
| 6,298,329 B1 | 10/2001 | Walker et al. | ................. 705/14 |
| 6,321,984 B1 | * 11/2001 | McCall et al. | ............... 235/380 |

FOREIGN PATENT DOCUMENTS

| | | | | |
|---|---|---|---|---|
| GB | WO 91/18373 A1 | * 11/1991 | ............. | G07F/7/02 |
| JP | 2217998 | 8/1990 | | |
| WO | WO 92/14213 | 8/1992 | | |
| WO | WO 96/06415 | * 2/1996 | | |

OTHER PUBLICATIONS

Womack, Phil "Regulations changing fuel management options", Baton Rouge Business Report: Jan. 28, 1992.*
Phil Womack "Regulations changing fuel management options", The Gale Group:Jan. 28, 1992.*

(List continued on next page.)

Primary Examiner—Eric W. Stamber
Assistant Examiner—Jean Janvier
(74) Attorney, Agent, or Firm—Steven W. Smith

(57) ABSTRACT

A system and method of cross-selling products and increasing fuel sales at a fuel service station. A price-per-unit (PPU) discount for fuel is associated with a purchase of a non-fuel product. A display screen at the dispenser then informs the customer of the PPU discount and that a future purchase of fuel can be currently made at today's price, or may be purchased over the Internet at a later time. The system determines whether the customer ordered a non-fuel product or future fuel, and records the customer's orders. The system then accepts the customer's payment for the non-fuel product and the future fuel, and discounts the PPU of the fuel by the amount associated with the purchase of the non-fuel product during a current fuel purchase by the customer. This is followed by encoding the customer's purchase of the non-fuel product and the customer's purchase of future fuel on a token, and providing the customer with the encoded token for redemption for the non-fuel product and/or for future fuel at a future date.

1 Claim, 6 Drawing Sheets

OTHER PUBLICATIONS

Barbara Grondin Francella, "Anybody's Fuel", Convenience Store News, Jul. 7, 1997, p. 31.

"Grocery–Gas Combo Opened by Nexus Fuel, 2000 Planned In Five Years", The Food Institute Report, v70, n32, Aug. 11, 1997.

John Callanan, "New Realities in Gasoline Marketing", Convenience Store News, Dec. 15, 1997, p. 50.

"Midland's Subsidiary, Arcon Energy, Inc. Sets Up a New Division", Business Wire, Apr. 7, 1998, p. 04071444.

"Esso Animates", Globe & Mail, Canada, Sep. 16, 1998, p. B31.

Lisa Gonderinger, "Grocery Adds Gas Pumps Albertson's Putting Minimarts in Supermarket Parking Lots", Arizona Republic, Oct. 29, 1998, p. D1.

Lisa Gonderinger, "Albertson's Puts Gas Pumps in Phoenix Supermarket's Parking Lot", KRTBN Knight–Ridder Tribune Business News (Arizona Republic), Oct. 29, 1998.

* cited by examiner

```
┌─────────────────────────┐                    ┌─────────────────────────┐
│ FUEL SALES RECEIPT      │ ─43                │ FUEL SALES RECEIPT      │ ─45
│                         │                    │                         │
│ AutoGas Systems         │                    │ AutoGas Systems         │
│ 1000 N. Walnut          │                    │ 1000 N. Walnut          │
│ New Braunfels, TX       │                    │ New Braunfels, TX       │
│                         │                    │                         │
│ SITE:  001234           │                    │ SITE:  001234           │
│ DATE:  04/26/99         │                    │ DATE:  04/26/99         │
│ TIME:  13:21            │                    │ TIME:  13:21            │
│ TRACE: 0835             │                    │ TRACE: 0835             │
│ VS**************3232    │                    │ VS**************3232    │
│ EXP 0201                │                    │ EXP 0201                │
│ APPROVAL: 00004322      │                    │ APPROVAL: 00004322      │
│                         │                    │                         │
│ PUMP:    4         ─49  │                    │ PUMP:    4              │
│ PRODUCT: UNLEAD    ─51  │                    │ PRODUCT: UNLEAD         │
│ PRICE/GAL:  $1.039 ─53  │                    │ PRICE/GAL:    $1.039    │
│ REWARD/GAL: $0.250 ─55  │                    │ QUANTITY:     12.43     │
│ NET/GAL:    $0.789      │                    │ FUTURE/QTY:   15.00     │
│ QUANTITY:   12.43       │                    │ NET TOTAL:    $28.50    │
│ NET TOTAL:  $9.81       │                    │                         │
│ MERCHDIS:   $2.49       │                    │ Thank You               │
│                         │                    │ For Shopping            │
│ CHRG TOTAL: $12.30      │                    │ With Us                 │
│                         │                    │ ***********************  │
│ Thank You               │               61─┐  │ Fuel Due ID             │
│ For Shopping            │               63─┤  │ |iii|liii|||i|iii|      │
│ With Us                 │                    │ ***********************  │
│ $2.49 Coke Cl 12 PK ─57 │                    │ Please Come Again       │
│ ***********************  │                    │                         │
│ Product ID Claim        │                    │                         │
│ |iii|liii|||i|iii| ─59  │                    │                         │
│ ***********************  │                    │                         │
│   ┌─────────────┐       │                    │                         │
│   │  Coca-Cola  │       │                    │                         │
│   └─────────────┘       │                    │                         │
│    Product Logo         │                    │                         │
│                         │                    │                         │
│ Please Come Again       │                    │                         │
└─────────────────────────┘                    └─────────────────────────┘

SYSTEM AND METHOD OF CROSS-SELLING PRODUCTS AND INCREASING FUEL SALES AT A FUEL SERVICE STATION

BACKGROUND OF THE INVENTION

1. Technical Field of the Invention

This invention relates to automated retail systems and, more particularly, to a system and method of increasing fuel sales and non-fuel product sales at a fuel service station.

2. Description of Related Art

Vendors of various products often find it desirable to enter into cross-marketing agreements in which the purchase of a product from a first vendor earns a discount coupon for the consumer on a product from a second vendor. As used herein, the term "vendor" refers to the manufacturer of a specific product or the supplier of specific services. The term "merchant" refers to the store where the products are purchased, such as grocery stores, convenience stores, gasoline service stations, unattended fueling stations, etc.

Merchants operating convenience stores often sell consumer products inside the store and sell gasoline outside the store. In addition, many gasoline service stations which primarily sell gasoline also sell consumer products. In order to tempt gasoline customers to purchase other products, these stores and stations often place advertising for in-store specials in the window or on digital displays on their gasoline dispensers. In addition, some gasoline service stations offer discounts for car washing services if a minimum amount of gasoline is purchased. However, prior to the present invention, there has not been a system or method of tying a gasoline purchase to a purchase of a consumer product or service in a way that makes it easy for the consumer to purchase the consumer product or service, and which provides an economic incentive for the customer to purchase additional products.

Merchants who sell a number of products would benefit from a system and method of increasing product sales and volume through a combination of cross-selling of products and future selling of products. The present invention provides such a system and method.

SUMMARY OF THE INVENTION

In one aspect, the present invention is a method of cross-selling products. The method includes the steps of associating a price-per-unit (PPU) discount for fuel with a purchase of a non-fuel product, informing a customer of the PPU discount associated with the purchase of the non-fuel product, recording the customer's purchase of the non-fuel product, and discounting the PPU of the fuel by the associated amount during a fuel purchase by the customer. The method may also include the steps of encoding the customer's purchase of the non-fuel product on an encoded token such as a paper receipt with a personal identification number (PIN) or bar code, magnetic strip, smart card, key fob, etc. and providing the customer with the encoded token for redemption for the non-fuel product.

In another aspect, the present invention is a method of increasing fuel sales at a fuel service station. The method includes the steps of informing a customer that a future purchase of fuel can be currently made at today's price, recording the customer's order for future fuel, accepting the customer's payment for the future fuel, encoding the customer's purchase of future fuel on a token, and providing the customer with the encoded token for redemption at a future date.

In yet another aspect, the present invention is a method of increasing a merchant's fuel sales at a fuel service station which includes the steps of informing a customer that the merchant offers a volume-sensitive discount on a future fuel purchase if the customer currently purchases a volume of fuel that exceeds a threshold amount of fuel, and determining whether the customer purchases a volume of fuel that exceeds the threshold amount. The volume-sensitive discount on future fuel is encoded upon determining that the customer purchased a volume of fuel that exceeds the threshold amount. This is followed by recording the customer's volume-sensitive discount on future fuel, encoding the customer's volume-sensitive discount on a token, and providing the customer with the encoded token for redemption at a future date.

The present invention is also a method of cross-selling products which includes the steps of associating a PPU discount for fuel with a purchase of a non-fuel product at a first site, informing a customer at the first site of the PPU discount associated with the purchase of the non-fuel product, determining that the customer ordered the non-fuel product, and discounting the PPU of the fuel by the associated amount during a fuel purchase by the customer. A reward file associated with the customer's purchase of the non-fuel product is recorded in a database at the first site, and the customer's purchase of the non-fuel product is encoded on a token. The encoded token is then provided to the customer for redemption for the non-fuel product. This is followed by determining at a later time that the customer has presented the token for redemption at a second site which communicates with the first site over a data network. The second site requests that the first site send the reward file, and the first site sends the reward file to the second site. The customer's token is then redeemed for the non-fuel product at the second site. Information regarding the redeemed token may then be sent to a central server in the data network which allocates a value of the non-fuel product to the first site.

In yet another aspect, the present invention is a system for cross-selling products which comprises a display screen at a fuel dispenser that informs a customer of a PPU discount for fuel which is awarded if the customer purchases an associated non-fuel product, means for the customer to purchase the non-fuel product at the dispenser, a database which records the customer's purchase of the non-fuel product, and a processor which discounts the PPU of the fuel by the amount of the PPU discount in response to the customer's purchase of the non-fuel product.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 3 is an exemplary printout of a fuel sales token on which the purchase of a non-fuel product is indicated;

FIG. 4 is an exemplary printout of a fuel sales token on which a future purchase of gasoline is indicated;

DETAILED DESCRIPTION OF EMBODIMENTS

The present invention enables a consumer at a gasoline service station to purchase both gasoline and additional consumer products (i.e., non-fuel products) in one convenient transaction. If paying by credit card, cash, prepaid card, smart card, or debit card at the gasoline dispenser, the consumer is given a coded token which is used in the station or at another participating location to pick up the non-fuel consumer products which were purchased. In addition, the consumer is given an incentive to purchase the non-fuel products by providing the consumer with a discounted price-per-unit (PPU) on the current gasoline purchase if the non-fuel products are purchased. Alternatively, the PPU discount may be applied to a future purchase of fuel. Additionally, the system may provide the consumer the opportunity to purchase future gasoline at today's street price. The system may also provide a volume-sensitive reward for the purchase of gasoline by offering the consumer a price-per-unit discount on a future purchase of gasoline if the consumer purchases more than a minimum required amount of gasoline.

Figure 1:
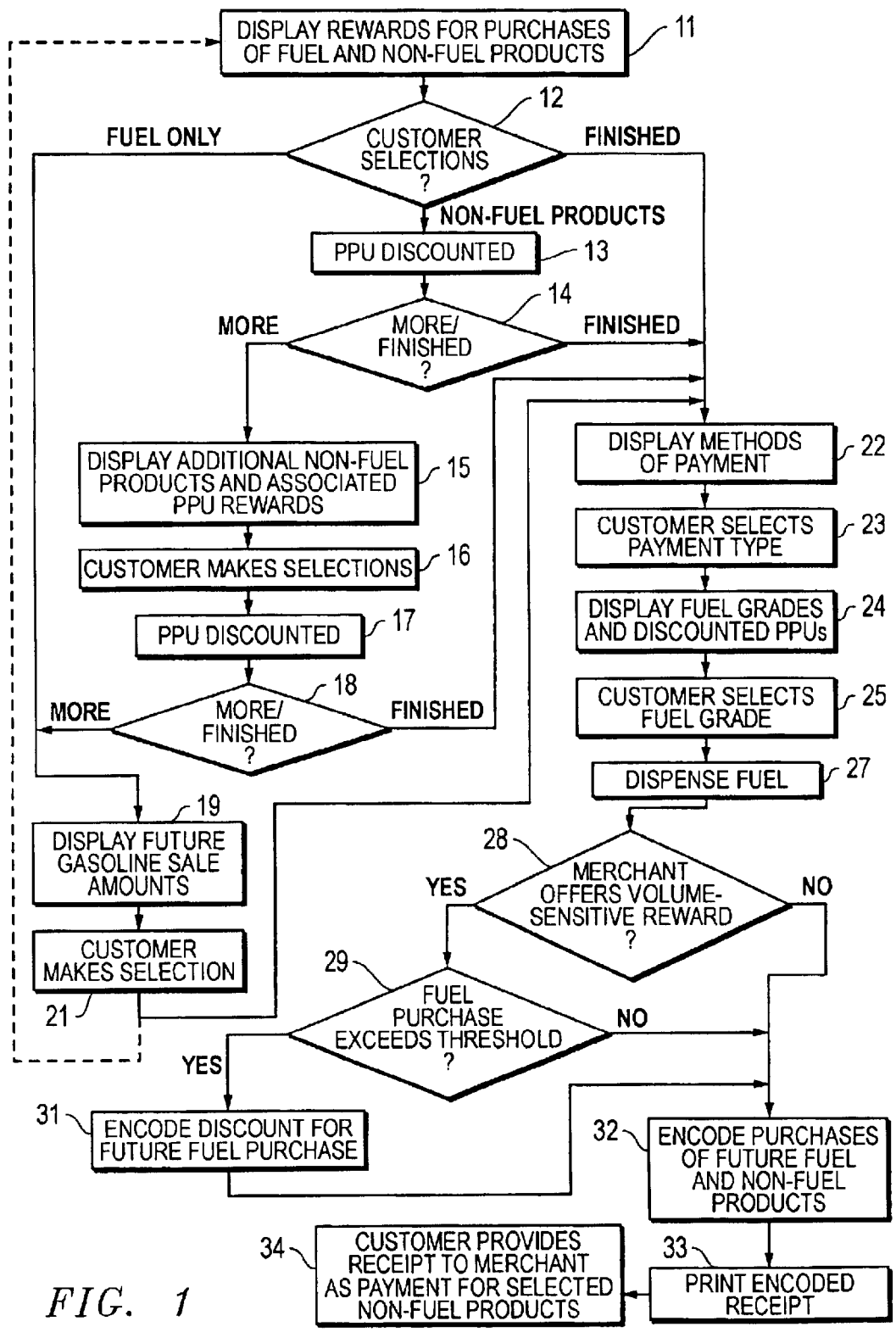
FIG. 1 is a flow chart illustrating the steps of the preferred embodiment of the method of the present invention.
Figure 2:
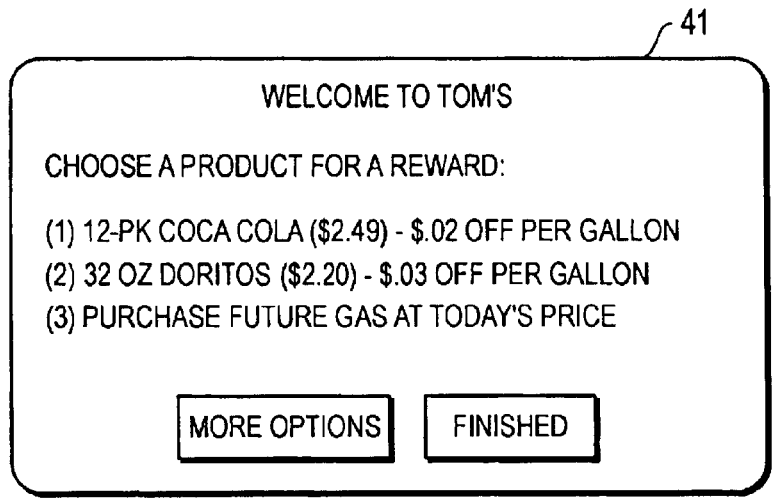
FIG. 2 is an exemplary display screen format offering a consumer various price-per-unit discount rewards on gasoline in exchange for purchasing cross-marketed consumer products.

FIG. 1 is a flow chart illustrating the steps of the preferred embodiment of the method of the present invention. At step 11, a display screen 41 (See FIG. 2) at the gasoline dispenser offers the consumer the opportunity to purchase non-fuel products at a given price, and receive an instant reward on the price-per-unit of gasoline, or to purchase future fuel at today's street price. An exemplary display screen format is illustrated in FIG. 2. The number of non-fuel products that can be purchased at the dispenser is not limited by the system, but is determined by the merchant. Other methods of conveying reward information to the customer, such as an audio message, may also be utilized in the present invention, as long as the information conveyed relates to a PPU discount in exchange for purchasing non-fuel products or future fuel.

At step 12, the customer makes his selections. The customer may select a future fuel purchase only, non-fuel products, or nothing by indicating FINISHED. If the customer selects fuel only, the process skips ahead to step 19. If the customer selects FINISHED, the process skips ahead to step 22. However, if the customer selects non-fuel products, the process moves to step 13 where the PPU of each grade of fuel is discounted accordingly. At step 14, the customer then selects MORE OPTIONS or FINISHED.

If the customer selects MORE OPTIONS, the process moves to step 15 where additional non-fuel products are displayed along with their associated PPU rewards. The customer makes additional selections at 16, and the PPU of each grade of fuel is discounted at step 17. As each non-fuel product is selected, the computed PPU is reduced accordingly. The amount of the reward may be paid to the oil company by the merchant or the vendors of the non-fuel products that were purchased. If the inside of the station is closed during certain hours, but the gasoline dispensers stay on for the use of customers, a scheduler (timer) may be utilized to disable the purchase of non-fuel products during the hours that the station is closed.

Once again at step 18, the customer selects MORE OPTIONS or FINISHED. If the customer selects FINISHED, the process skips to step 22. However, if the customer selects MORE OPTIONS, the process moves to step 19 where future fuel sale amounts are displayed. For example, the customer may be given the choice to purchase, at today's street price or a fixed price, gallons of gasoline ranging from 10 to 40 gallons in 5-gallon increments. The customer then selects the desired amount and grade of fuel at step 21.

The process then moves to step 22 where optional methods of payment are displayed to the customer. Optionally, the process may return from step 21 to step 11 where the display screen 41 again offers the consumer the opportunity to purchase non-fuel products for an instant reward on the price-per-unit of gasoline, or to purchase future fuel at today's street price. If the customer selects FINISHED, the process then moves to step 22 where optional methods of payment are displayed to the customer. The customer selects a payment type at 23, and if paying outside with a credit card or debit card, the authorization process is performed. At step 24, optional fuel grades such as unleaded, plus, and super are displayed to the customer along with their discounted PPUs. The customer then selects a fuel grade at 25.

The dispenser is then activated, and the fuel is dispensed at 27. With the present invention, some merchants may provide a volume-sensitive reward for the purchase of gasoline by offering the consumer a PPU discount on a future purchase of fuel if the consumer purchases more than a minimum required amount of fuel. Therefore at step 28, it is determined whether or not the merchant offers a volume-sensitive reward. If not, the process skips to step 32. If the reward is offered, the process moves to step 29 where it is determined whether or not the fuel purchase exceeded the required threshold amount to be eligible for the volume-sensitive reward. There may be multiple threshold amounts for differing reward levels, and this determination may include referencing a table such as Table 1 below. If the minimum threshold level was not exceeded, the process skips to step 32. If the purchase exceeded the minimum threshold amount, the process moves to step 31 where the system encodes the appropriate discount earned for the future fuel purchase.

TABLE 1

| Fuel Volume<br>Currently Purchased | Reward on Next<br>Fuel Purchase |
| --- | --- |
| 1 to 2 volume units | $0.01 per gallon |
| 3 to 4 volume units | $0.02 per gallon |
| 5 to 8 volume units | $0.03 per gallon |
| 9 to 11 volume units | $0.04 per gallon |
| 12 to 15 volume units | $0.05 per gallon |

The process then moves to step 32 where the system encodes any purchases of future fuel that the customer made at step 21, and any purchases of non-fuel products that the customer made at steps 12 or 16. Purchases of future fuel are encoded with the PPU set for each grade of fuel. Table 2 below represents an exemplary database of PPUs for each grade of gasoline. Rewards may vary by grade and by amount of gasoline purchased.

TABLE 2

| Volume Units | Regular Unleaded | Super Unleaded | Premium Unleaded |
|---|---|---|---|
| 10 gallons | $0.89 = ($8.90) | $1.09 = ($10.90) | $1.12 = ($11.20) |
| 15 gallons | $0.87 = ($13.05) | $1.07 = ($16.05) | $1.10 = ($16.50) |
| 20 gallons | $0.84 = ($16.80) | $1.04 = ($20.80) | $1.07 = ($21.40) |

Figure 5:
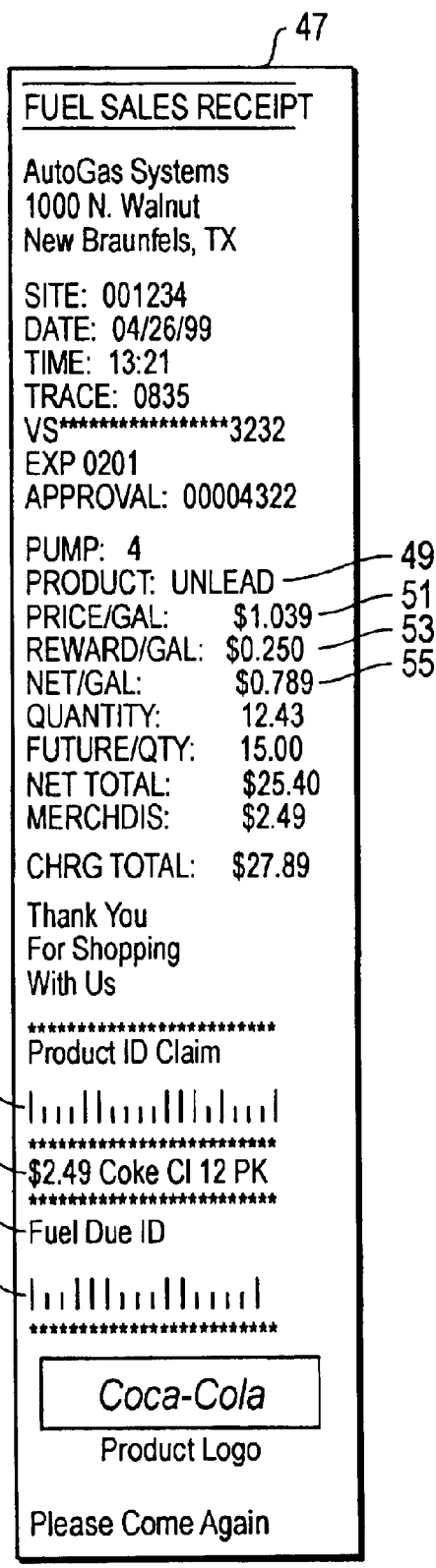
FIG. 5 is an exemplary printout of a fuel sales token on which the purchase of a non-fuel product and a future purchase of gasoline are indicated.

An encoded fuel sales token is then printed at step 33. Exemplary printouts of the fuel sales token are illustrated in FIGS. 3–5. At step 34, the customer then provides the encoded sales token to the merchant as payment for the non-fuel products that were selected. If a future fuel discount was earned, the customer returns at a future date and enters the token into an input device at the dispenser such as a bar code scanner, card reader, PIN pad, etc. The PPU of the fuel is then reduced by the encoded discount amount.

When the purchase is encoded, identifying data is also stored locally in a rewards database. The identifying data includes the date of the purchase, the products purchased, the discount earned, the merchant where the purchase was made, and the location of the merchant. The purchase of future fuel is tracked locally by grade and volume, and tax data to report all applicable taxes to city, regional, and state taxing authorities is contained in the file. However, the customer can redeem the purchase at any merchant location in a participating network of merchants. If the total taxes are greater at the redeeming site than the taxes at the site where the fuel was purchased, the redeeming merchant may have to absorb the difference by reducing his profit margin. Alternatively, the customer can be informed at the time of purchase that the quoted price includes taxes in effect at the site (and time) where the fuel was purchased, but that higher taxes at other locations or later times could result in a higher PPU when redeemed.

FIG. 3 is an exemplary printout of a fuel sales token 43 on which the purchase of a non-fuel product is indicated. The token indicates a fuel type 49, a standard PPU (price/gal) 51, a reward per gallon 53, and a net PPU 55 after the reward is applied. The non-fuel product which was purchased is also indicated at 57 on the token. The purchase is further indicated in a non-fuel product bar code 59.

FIG. 4 is an exemplary printout of a fuel sales token 45 on which a future purchase of fuel is indicated. There is no immediate PPU reward, so the token reflects the standard information for a fuel purchase. However, a Fuel Due ID 61 is provided along with a fuel bar code 63 for the future fuel that was purchased.

FIG. 5 is an exemplary printout of a fuel sales token 47 on which the purchase of a non-fuel product and a future purchase of gasoline are indicated. The token indicates the fuel type 49, the standard PPU (price/gal) 51, the reward per gallon 53, and the net PPU 55. The non-fuel product which was purchased is also indicated at 57 on the token. The purchase is further indicated in a non-fuel product bar code 59. The token additionally indicates the Fuel Due ID 61 along with a fuel bar code 63 for the future fuel that was purchased.

Figure 6:
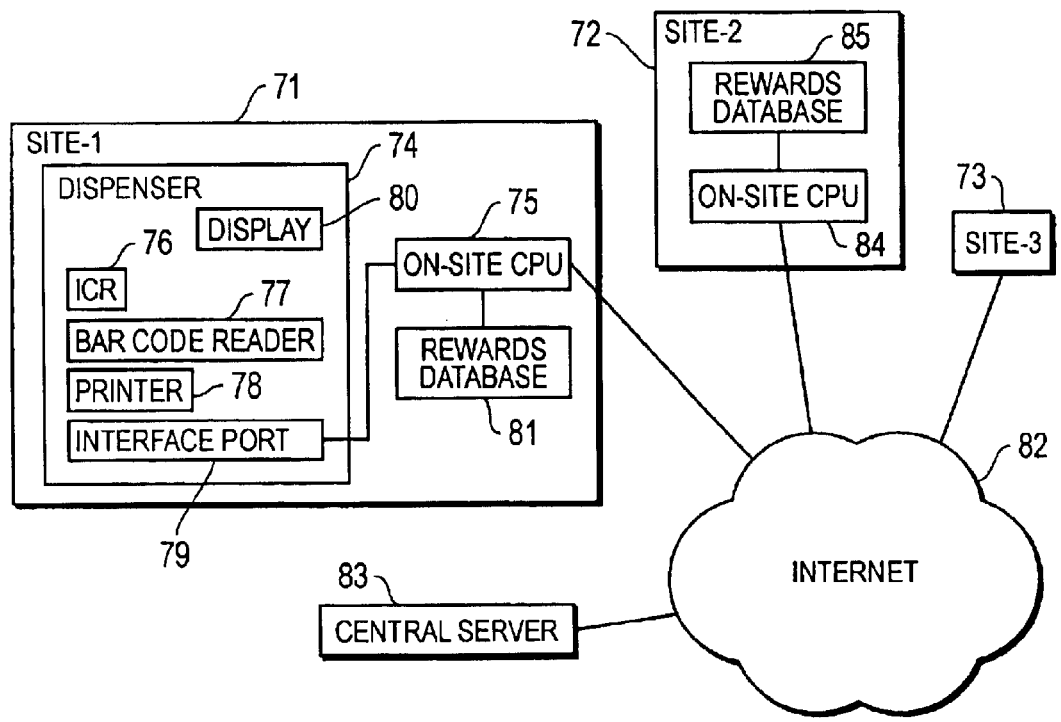
FIG. 6 is a simplified block diagram of the system of the present invention.

FIG. 6 is a simplified block diagram of the system of the present invention. Three sites, Site-1 (71), Site-2 (72), and Site-3 (73) are illustrated although in actuality, the number of sites may be greater or lesser than three. Each site may represent, for example, a fuel service station, a store in a chain of merchant stores, a vendor in a strip shopping center (such as a fast food restaurant or a cleaners) or a vendor in a shopping mall (such as a department store). All sites that sell fuel include a fuel dispenser 74 which includes an on-site processor (CPU) 75, an island card reader (ICR) 76 for reading credit and debit cards, a bar code reader 77 or other input device for entering customer tokens, a printer 78 for printing customer tokens, an interface port 79 for interfacing with the on-site CPU, and a display screen 80 for displaying information to the customer and receiving customer inputs. The on-site CPU is connected to a rewards database 81 for storing information relating to issued and redeemed rewards.

In FIG. 6, Site-1 represents a site with fuel sales, and therefore includes the fuel dispenser 74. Site-2 represents a site without fuel sales, and therefore includes only an on-site CPU 84 and a rewards database 85. Site-3 may be either of the above or may be an Internet access device such as a personal computer (PC) at a customer's home or office. Each site is connected through its on-site CPU to a data network such as the Internet 82 for communication with other sites and with a central server 83 which collects from the sites, reward information and allocations to merchants and vendors made by the site CPUs. Thus, each site has access to the rewards issued at other sites.

Figure 7A:
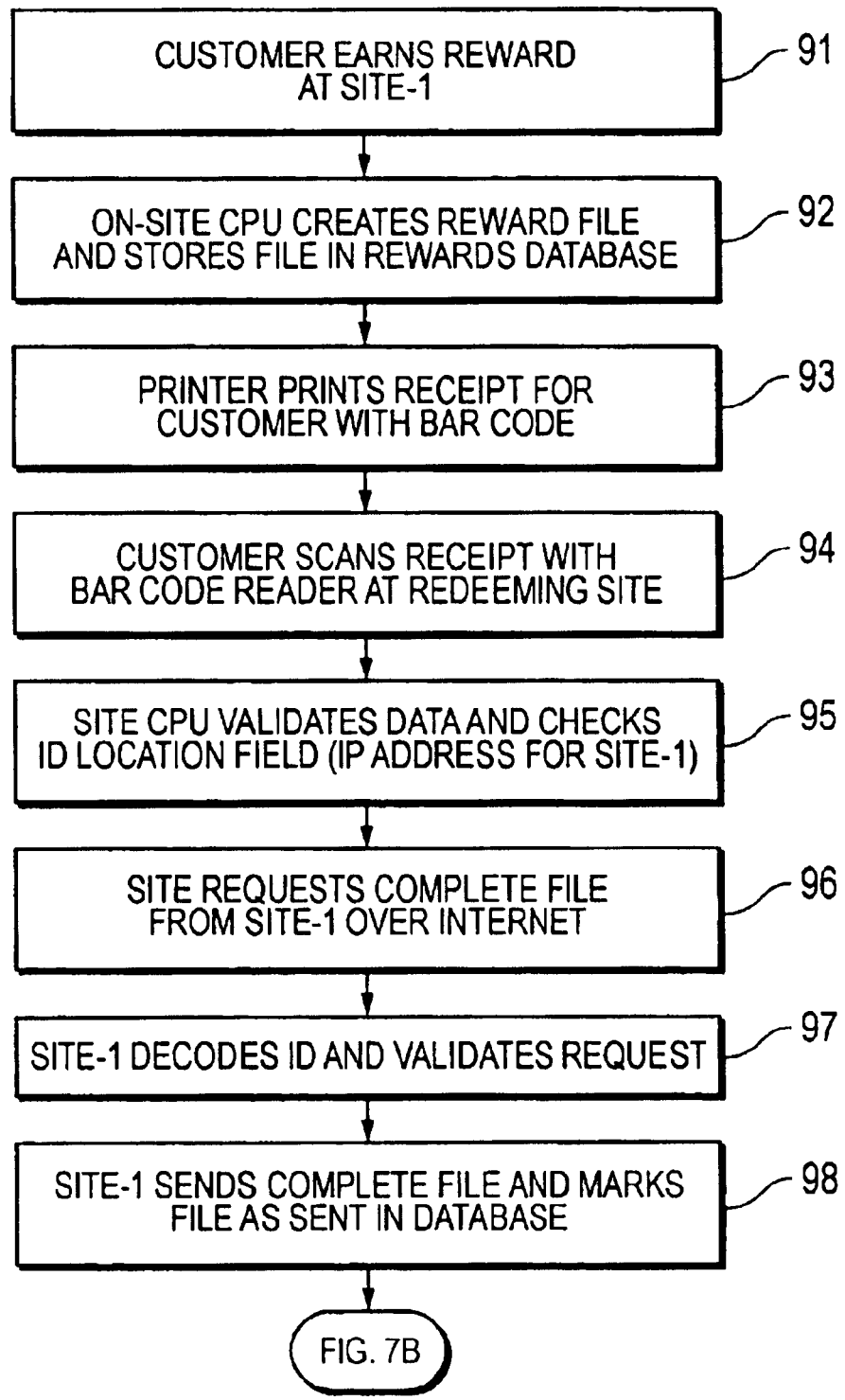
FIGS. 7A and 7B are a flow chart illustrating the steps of the method of the present invention when handling a reward that is earned at a first site and redeemed at a second site.
Figure 7B:
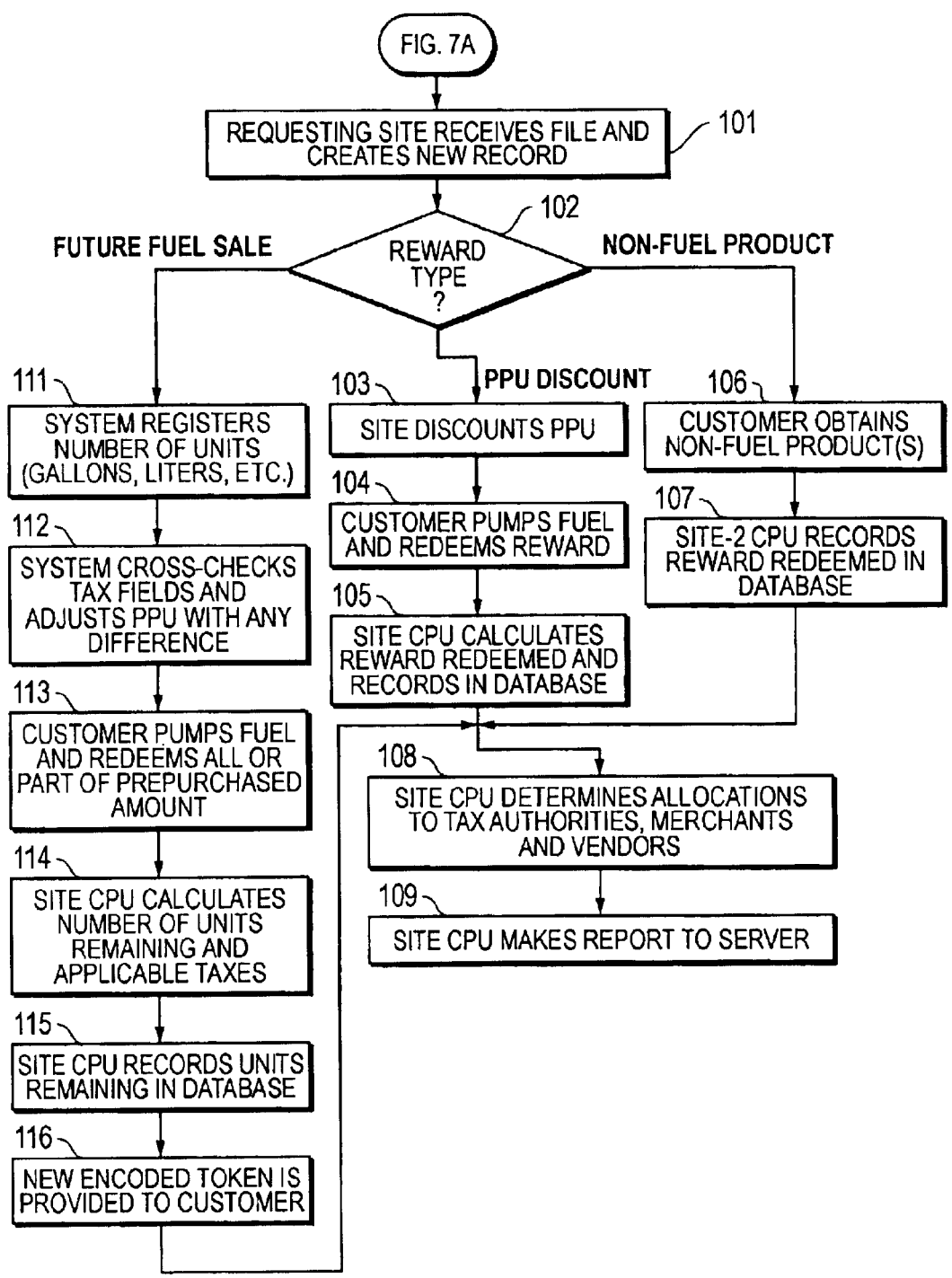

FIGS. 7A and 7B are a flow chart illustrating the steps of the method of the present invention when handling a reward that is earned at a first site and redeemed at a second site. At step 91 of FIG. 7A, a customer earns a PPU discount reward at Site-1 as described above in FIG. 1. The on-site CPU 75 at Site-1 then creates a reward file at step 92 and stores the file in the rewards database 81. The printer 78 then prints a token for the customer at step 93. As illustrated in FIGS. 3–5, the token includes a bar code in which the earned reward is encoded.

At a later point in time, the customer travels to another site to redeem the earned reward. If the redeeming site is a site where fuel is sold, the customer may scan the token at step 94 utilizing the bar code reader at the site dispenser. If the redeeming site does not sell fuel, and the reward is for a non-fuel product, the token may be scanned by a store clerk at a point-of-sale (POS) terminal. At step 95, the site CPU validates the scanned data and checks an ID location field to determine the IP address of the issuing site, in this case Site-1. At step 96, the site CPU requests the complete reward file from Site-1 over the Internet 82. The Site-1 CPU decodes the ID field to determine the IP address of the requesting site, and validates the request at step 97. At step 98, the Site-1 CPU then retrieves the complete file from the rewards database, sends the file to the requesting site, and marks the file as "sent" in the rewards database. The process then moves to step 101 of FIG. 7B At step 101, the requesting site CPU receives the complete file and creates a new record. It is determined at step 102 whether the reward is for a future fuel sale, a discounted PPU for a fuel sale, or is for one or more non-fuel products purchased at another location. If the reward is for a discounted PPU for a fuel sale, the process moves to step 103 where the site CPU discounts the PPU of the fuel accordingly. The customer then pumps fuel at step 104 and redeems the reward. At step 105, the site CPU calculates the reward redeemed by, for example, multiplying the PPU discount by the number of gallons purchased. The redeemed reward is then marked and stored in the site rewards database.

As noted above, the process described in FIGS. 7A and 7B may also be utilized to redeem, at other sites in the network, purchases of non-fuel products purchased at a first site. Thus, while a customer can purchase a non-fuel product at the first site and receive the discount on the PPU of the fuel, the token does not have to be redeemed immediately or even at the same site. For example, if the station at Site-1 is very crowded inside, and the customer does not want to wait inside to redeem the token, the customer can come back later or can proceed to another network site such as Site-2 to redeem the token. If the product or service is purchased at a shopping mall, the customer can enter a participating retailer's store and pick up the product.

Therefore, if it was determined at step 102 that the scanned token revealed a reward for one or more non-fuel products, then the process moves from step 102 to step 106 where the customer obtains the non-fuel product(s) at, for example, Site-2. At step 107, the Site-2 CPU 84 records the reward redeemed in the Site-2 rewards database 85.

If it was determined at step 102 that the scanned token revealed a future fuel sale (i.e., the customer pre-purchased a number of units of fuel), then the process moves from step 102 to step 111 where the system registers the number of units of fuel (e.g., gallons, liters, etc.) that were pre-purchased. At step 112, the system cross-checks tax fields in its database and determines any difference between the total taxes at the site where the fuel was purchased and the site where the token is being redeemed. If there is any difference, the PPU is adjusted for the difference. At step 113, the customer pumps fuel and redeems all or part of the pre-purchased amount. If only part of the pre-purchased amount was redeemed, the site CPU calculates the number of units remaining and calculates applicable taxes at step 114. At step 115, the site CPU records the units remaining in the site database, and at step 116 a new encoded token is provided to the customer reflecting the number of units remaining.

From step 105, step 107, or step 116, the process then moves to step 108 where the site CPU at the redeeming site determines allocations to tax authorities and merchants and vendors of the fuel and/or the non-fuel products. The central server 83 may be programmed to collect site information in real time or periodically such as once per day, or every 12 hours, etc. Therefore, at step 109, the redeeming site CPU makes a report of the redeemed rewards to the central server.

Referring again to FIG. 6, it was noted that Site-3 may be a customer's PC at his home or office, etc. From the customer's PC, the customer may access the Internet and reach the web site for a fuel vendor. Through the web site, the customer may purchase future fuel or non-fuel products and receive the same rewards that are available through purchases at the fuel dispenser. The system may print an encoded token for the customer on the customer's printer. When the customer presents the token for redemption at a participating site, the encoding may reveal an IP address for the central server as the site where the purchase was made, thereby validating the purchase.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. A method of cross-selling products and increasing fuel sales at a fuel service station, said method uses a fuel service station system to perform the steps of:

associating a price-per-unit (PPU) discount for fuel with a purchase of a non-fuel product;

informing a customer at the fuel service station by displaying information on a fuel service station dispenser screen, of the PPU discount associated with the purchase of the non-fuel product, and that a future purchase of fuel can be currently made at today's price;

determining that the customer ordered a non-fuel product;

recording the customer's order of the non-fuel product;

determining that the customer ordered future fuel;

recording the customer's order for future fuel;

discounting the PPU of the fuel by the amount associated with the purchase of the non-fuel product during a current fuel purchase by the customer;

informing the customer by displaying information on the fuel service station dispenser screen, that the fuel service station offers a volume-sensitive discount on a future fuel purchase if the customer currently purchases a volume of fuel that exceeds a threshold amount of fuel;

determining whether the customer purchases a volume of fuel that exceeds the threshold amount;

accepting the customer's payment for the non-fuel product, the current fuel purchase, and the future fuel;

encoding the customer's purchase of the non-fuel product and the customer's purchase of future fuel on a token, said encoding step including encoding the volume-sensitive discount on the token, upon determining that the customer purchased a volume of fuel that exceeds the threshold amount;

providing the customer with the encoded token for redemption for the non-fuel product and for future fuel at a future date; and recording the customer's volume-sensitive discount applicable to a future fuel purchase.

\* \* \* \* \*